United States Patent [19]

Kawashima

[11] Patent Number: 5,497,250
[45] Date of Patent: Mar. 5, 1996

[54] DOCUMENT SCANNING APPARATUS HAVING A STAMP AND METHOD FOR CONTROLLING THE STAMPING POSITION

[75] Inventor: Yasuhiro Kawashima, Atsugi, Japan

[73] Assignee: Ricoh Company, Ltd., Tokyo, Japan

[21] Appl. No.: 289,550

[22] Filed: Aug. 12, 1994

[30] Foreign Application Priority Data

Aug. 12, 1993 [JP] Japan ................... 5-200810

[51] Int. Cl.[6] .............. H04N 1/21; H04N 1/23; H04N 1/04
[52] U.S. Cl. .............. 358/498; 358/296; 358/488
[58] Field of Search ................ 358/400, 401, 358/405, 402, 440, 434, 496, 497, 296, 488, 474, 498

[56] References Cited

U.S. PATENT DOCUMENTS

| D. 351,412 | 10/1994 | Noonan et al. | D18/56 |
|---|---|---|---|
| 3,768,403 | 10/1973 | Rose | 101/93 |
| 4,155,544 | 5/1979 | Scott | 271/8 |
| 4,908,714 | 3/1990 | Iriyama et al. | 358/496 |
| 4,991,828 | 2/1991 | Mizoguchi | 271/3 |
| 5,042,382 | 8/1991 | Yamazaki et al. | 101/379 |
| 5,046,419 | 9/1991 | Zoltner | 101/235 |

OTHER PUBLICATIONS

"Canon NP–4835s Operator's Manual"© 1989 by Canon Inc. pp. 10 and 11.

Primary Examiner—Edward L. Coles, Sr.
Assistant Examiner—Kimberly A. Williams
Attorney, Agent, or Firm—Oblon, Spivak, McClelland, Maier & Neustadt

[57] ABSTRACT

A document scanning apparatus includes an automatic document feeder having at least a pick-up section for picking up documents to be scanned and a feed-out section which ejects the scanned document. A sensor in the pick-up section detects the length of the document to be scanned. A stamp located at the feed-out section marks the scanned sheets with a stamp and is controlled by a controller which controls the stamp position based on the length information obtained by the sensor in the pick-up section.

22 Claims, 6 Drawing Sheets

DOCUMENT SCANNING APPARATUS HAVING A STAMP AND METHOD FOR CONTROLLING THE STAMPING POSITION

BACKGROUND OF THE INVENTION

1. Field of the Invention

This invention relates to a scanning apparatus having a recycling styled automatic document feeder capable of stamping on documents after scanning of the documents, and a method of controlling the stamping position on the documents.

2. Description of the Related Art

Generally, there are known two styles of automatic document feeders. One includes a scanner at a fixed position which has the document sheets passing therethrough and is known as a pass-through type automatic document feeder. The other style is a page recycling type automatic document feeder in which a page is scanned by what is typically a moving scanner. Usually, the pass-through type document feeder is used for facsimile machines, and the recycling styled automatic document feeders are used for copier machines. Recent multi-functioned complex machines with a facsimile function and a copier function can use the recycling type feeder but it is also possible to use both types of feeders in the same device.

The process of transmitting a document by facsimile takes much longer than photocopying the document and often, an operator will leave the proximity of the facsimile machine in order to perform other tasks as the document is being transmitted. In order to indicate which pages of the document have been successfully transmitted, each page which has been successfully transmitted without error (or stored) can be stamped by a stamping device. The stamped pages are a quick indication to the operator that a page was successfully transmitted or stored.

Some newer high speed scanning devices permit an entire document to be quickly scanned into memory. However, this type of device can be costly because of the large amount of memory necessary to store digitized documents, especially when the information is stored as colored images. However, even in these devices, the stamping operation can be useful.

FIG. 14 is a sectional view showing a prior art multi-functioned complex machine including a pass-through type of automatic document feeder. In FIG. 14, the multi-functioned complex machine includes three functional sections; a document feeder section H having a pass-through styled automatic document feeder, a document scanner section I, and a printer section J. The document feeder section H has a mechanism for conveying document sheets to the scanner section I. The scanner section I contains the mechanism for scanning data on the document sheets, and the printer section J prints on pages and ejects the printed pages.

In FIG. 14, the document feeder section H includes a document table 101, pick-up rollers 102, a pick-up lever 103, a friction belt 104, feed rollers 105, a pair of transport rollers 106, a document feed sensor 107, a scanning guide plate 108, a pair of exit rollers 109, a stamper 110, a document receiving tray 111, an elastic member 112, and a white background 113.

The scanning section I includes a first mirror carriage 50, a second mirror carriage 51, a lens 52, a charge couple device (CCD) 53, and an exposure glass 54. In the printer section I, 55 is a tray for holding printed pages.

Documents to be scanned are set on the table 101 with the data side down. The document sheets are fed to the position between the friction belt 104 and the feed rollers 105 by pick-up rollers 102, and the bottom sheet is separated from the others at this location. The pair of transport rollers 106 drives the sheet to the position between the scanning guide plate 108 and the exposure glass 54. The document feed sensor 107 detects the forward and back edges of each sheet. The start and stop timing of scanning are decided by information from the document feed sensor 107.

A light source 50a located in the first mirror carriage 50 irradiates light on the data side of the document sheet. An image of the document is reflected off of a mirror 50b located in the first mirror carriage 50, off of a mirror 51a located in the second mirror carriage 51, and off of a mirror 51b located in the second mirror carriage 51. The light reflected off of the mirror 51b passes through the lens 52, and forms an image on the CCD 53. For the above-described operation, the first mirror carriage 50 and the second mirror carriage 51 are fixed and do not move. After scanning, the document sheet is stamped at a predetermined position by the stamper 110 and the stamped document is ejected to the document receiving tray 111.

Although the prior art pass-through document feeder illustrated in FIG. 14 has the advantages of having a stamper 110, it has a major problem in that if it is necessary to scan a document twice in order to transmit the document by facsimile to two different locations or to photocopy the document twice, the document must be scanned once and then removed from the tray 110 and placed back on the document table 101, thus making it impossible to automatically scan a sheet of the document after it has been scanned once and ejected.

FIG. 15 is a sectional view showing a prior art multi-functioned complex machine having a recycling styled automatic document feeder. Throughout the drawings, like reference numerals designate the same or corresponding parts and therefore, a description of previously described elements may not necessarily be repeated. In FIG. 15, the document feeder section H includes a document table 1, a pick-up roller 2, a pick-up lever 3, a friction belt 4, a feed roller 5, a relay roller 6, a document sensor 7, a transport belt 8, an exit roller 9, an assistant roller 10, a document exit sensor 11, and a receiving tray 12.

Document sheets to be scanned are set on the document table 1 with the data side up. The bottom sheet is sent to the position between the friction belt 4 and the feed roller 5 by the pick-up rollers 2. As the sheet travels around feed roller 5, its orientation is changed from data side up to data side down facing the scanning mechanism. The transport belt 8 drives the separated document sheet to a predetermined position on the exposure glass 54. When the separated document sheet reaches the predetermined position, the transport belt 8 stops, and the separated document sheet is scanned by the movement of the first mirror carriage 50 and the second mirror carriage 51. After scanning the separated document sheet, the transport belt 8 drive the separated document sheet to the document feed-out section including an exit roller 9. The exit roller 9 and an assistant roller 10 drive in order to eject the separated document sheet past a document exit sensor 11 to a document receiving tray 12.

Comparing the above two styled automatic document feeders, the recycling styled automatic document feeder is more convenient than the pass-through type automatic document feeder because it returns the scanned documents to an area near where they were first located. However, with the recycling style feeder, there are no known prior art devices which include a stamper as it is difficult to stamp the document sheet because of the location of the stamper being away from the scanner. Problems also result because the document conveying speed of the recycling styled feeder is higher than that of the pass-through styled automatic document feeder, making it difficult to control the timing of the stamping.

SUMMARY OF THE INVENTION

It is therefore an object of the present invention to provide a document scanning apparatus having, for example, a recycling styled automatic document feeder which performs a stamping operation.

It is a further object of the invention to determine the stamping position based on the length of the document.

These and other objects of the invention are accomplished by a document scanning apparatus including an automatic document feeder having at least a section for picking up a document to be scanned, and a feed-out section which ejects a scanned document. There is a sensor located in the pick-up section for detecting the length of the document to be scanned, and a controller for controlling the stamp position according to information regarding the length of the document from the sensor. The controller determines the position to be stamped based on the length of the document, a front edge of the document, or a rear edge of the document.

The scanning apparatus can be a facsimile, a copier, a digital copier, an electrical filing system, or an optical filing system. The invention can also be embodied in a multi-functioned complex machine having a combination of at least two of a facsimile machine, a digital copier, an electrical filing system, or an optical filing system.

A switch can be included in the invention which selectively engages and disengages the stamping function. It is also possible to have the stamp operate only when a multi-functioned complex machine is used as a facsimile.

During the operation of the invention, the feed-out section can include one or more exit rollers which are stopped when the stamper is engaged. Alternatively, a rotary styled stamper can be used which allows stamping of the document without stopping of the exit rollers.

The invention also includes a method for stamping a document having the steps of detecting the length of a document to be scanned, calculating a position of stamping pertaining to the length of the document, and stamping the document based on the calculated position. The calculated position can be based on an edge of the document to be scanned.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
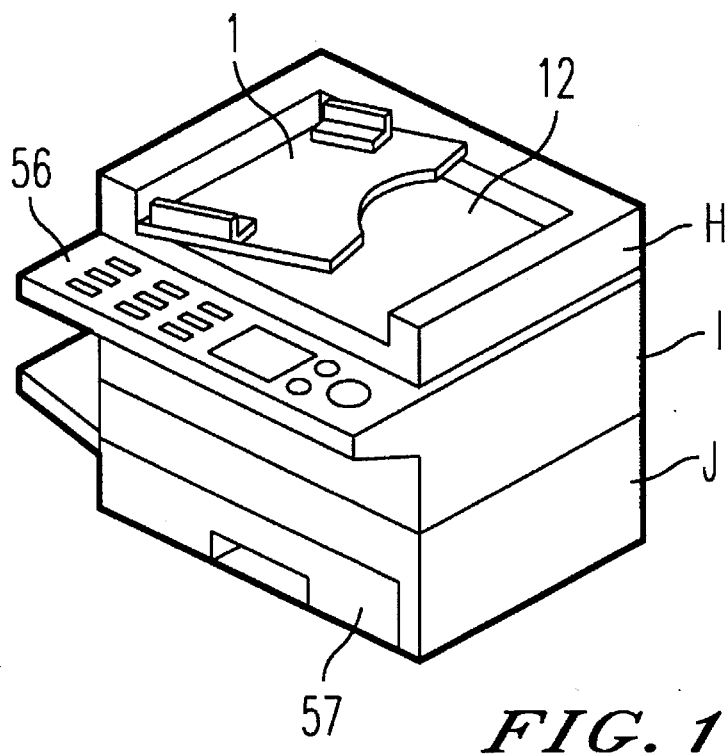
FIG. 1 is a perspective view showing a multi-functioned complex machine including a recycling styled automatic document feeder.

Referring now to the drawings, wherein like reference numerals designate identical or corresponding parts throughout the several views, and more particularly to FIG. 1 thereof, there is illustrated a multi-functioned complex machine. The multi-functioned complex machine includes three functional sections; a document feeder section H having a recycling styled automatic document feeder, a document scanner section I, and a printer section J. The document feeder section H has a mechanism for conveying document sheets to the scanner section I. The scanner section I contains the mechanism for scanning data on the document sheets, and the printer section J prints on pages and ejects the printed pages onto a document receiving tray 12.

An operation board 56 is for inputting data which controls the multi-functioned complex machine, for example, by changing the function from a copier to a facsimile. A cassette 57 is for storing blank paper.

Figure 2:
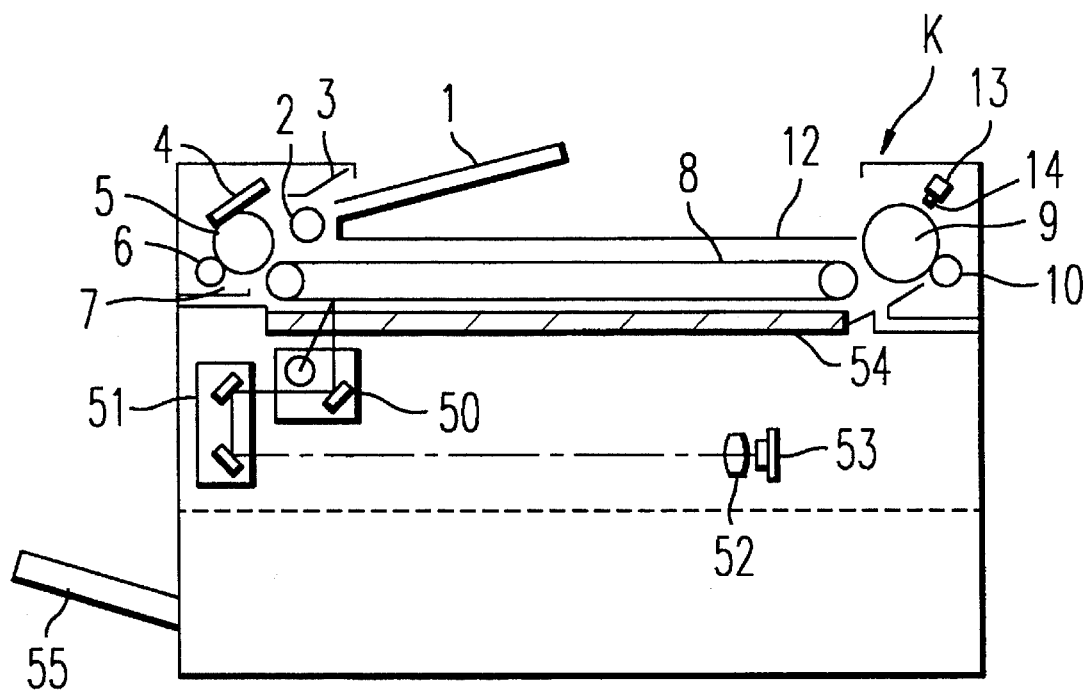
FIG. 2 is a sectional view showing the multi-functioned complex machine illustrated in FIG. 1 and including a stamp.
Figure 15:
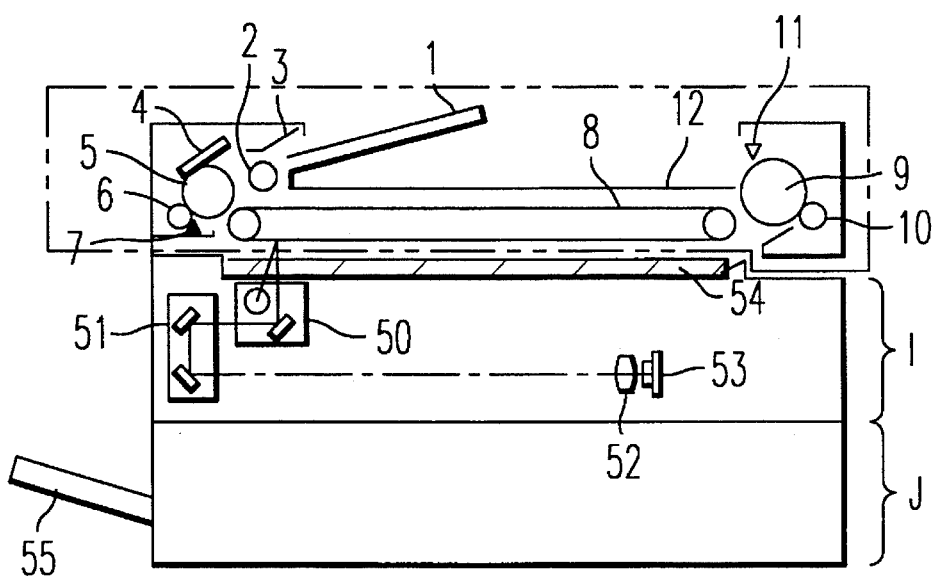
FIG. 15 is a sectional view of a prior art multi-functioned complex machine including a recycling styled automatic document feeder.

FIG. 2 is a cross-sectional view of the device shown in FIG. 1. FIG. 2 contains similar elements as the elements illustrated in FIG. 15 described above in the Background Section and the description of the same parts will not be repeated. A difference between FIG. 2 and FIG. 15 is that in the ejection section K of FIG. 2, there is contained a stamper. The ejection section and stamper thereof are illustrated in the enlargements contained in FIG. 3 and FIG. 4.

Figure 3:
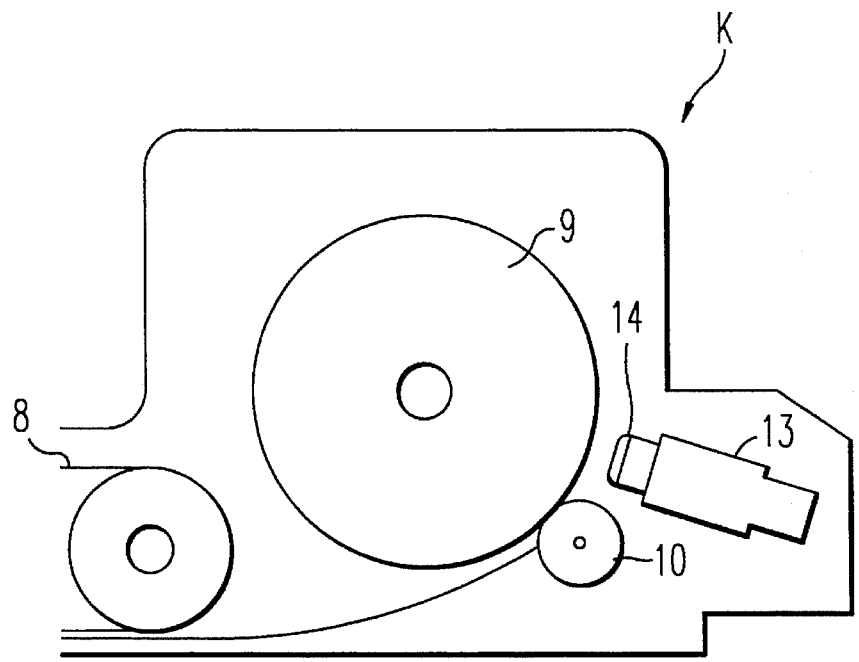
FIG. 3 illustrates an enlargement of the ejection section K of the document feeder including a linear solenoid stamper.

FIG. 3 illustrates a solenoid driven stamper 13 having stamp head 14. When the page is contacting exit roller 9 and when the stamper 13 receives a signal to stamp, the solenoid engages and the stamper contacts the page which is resting against the exit roller 9. It may be desirable to stop the roller 9 while the stamper 13 is engaged in order to obtain the clearest stamp on the page.

Figure 4:
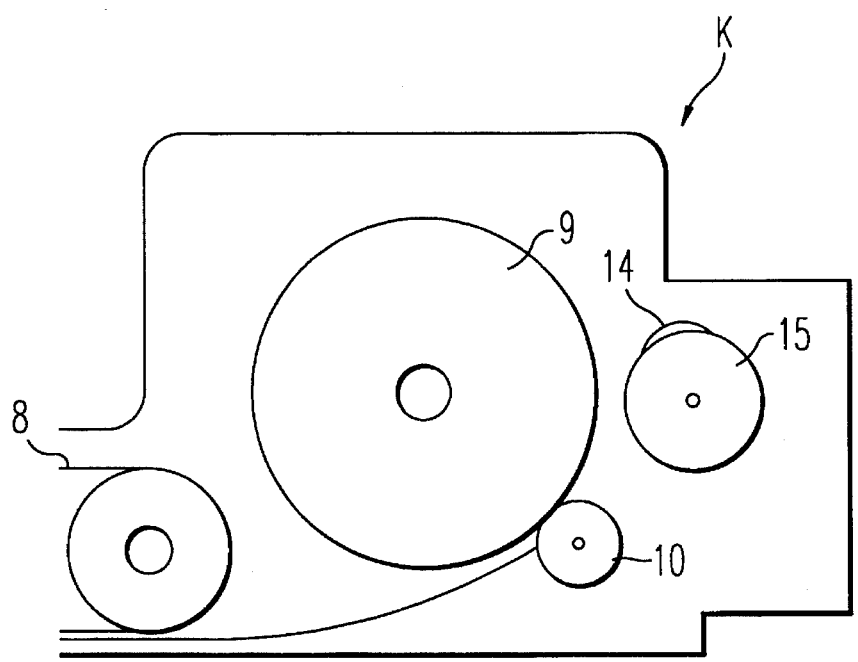
FIG. 4 is an enlargement of the ejection section K of the document feeder having a rotary stamper.

FIG. 4 illustrates a rotary styled stamper embodied in stamper roller 15 having stamp head 14. At the desired time, the stamper roller 15 engages against the page contacting exit roller 9 and the stamp head 14 contacts the page, thus stamping it. It is to be noted that the size of the stamp head 14 has been exaggerated for illustration purposes. The actual mark left by any of the stampers or printers used by the invention can be any mark including an "X", the letters "OK", the letters "OK'd", the date and time of scanning, identification of the machine which performed the scanning, an indication of the success of a particular scan when the document is scanned a plurality of times, or any other desired stamp.

Figure 5:
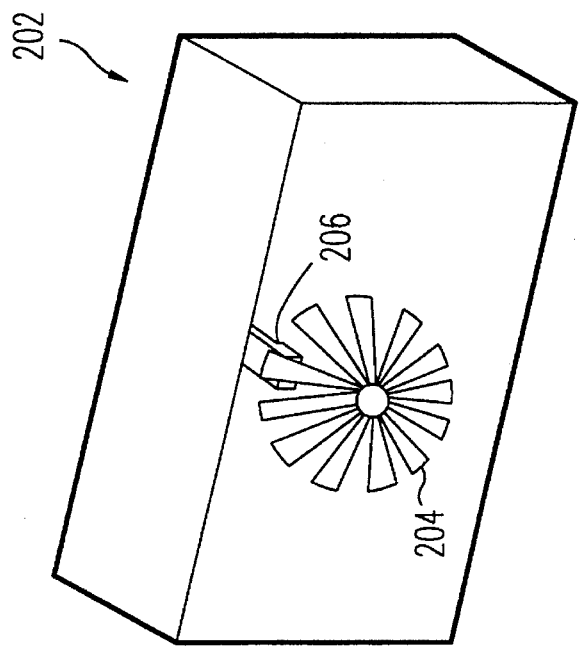
FIG. 5 is an illustration of a daisy-wheel printer.

FIG. 5 illustrates a daisy-wheel printer which can be inserted into the document eject section K. The daisy-wheel printer 202 includes an impact hammer 206 and a daisy-wheel 204. The printer operates by rotating the daisy-wheel 204 until the desired character is in front of the impact hammer 206 and then the impact hammer 206 presses the character to be printed against the paper. Of course, there would be some type of conventional mechanism for inking the printing character and the daisy wheel 204 and the impact hammer 206 can move across the width of the paper.

Figure 6:
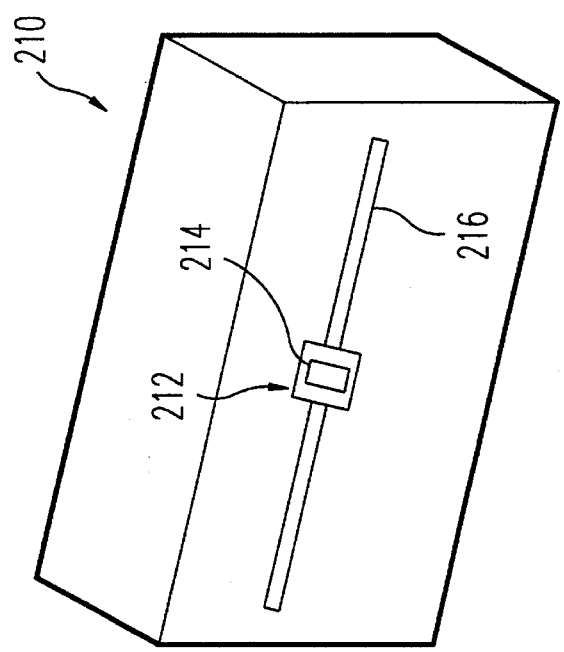
FIG. 6 is an illustration of a dot matrix printer.

FIG. 6 illustrates a dot matrix printer 210 which can be located in the printer section K. The dot matrix printer has a head 212 containing a desired number of pins labeled 214. The print head 212 slides along rod 216 in order to print across the width of the paper.

Figure 7:
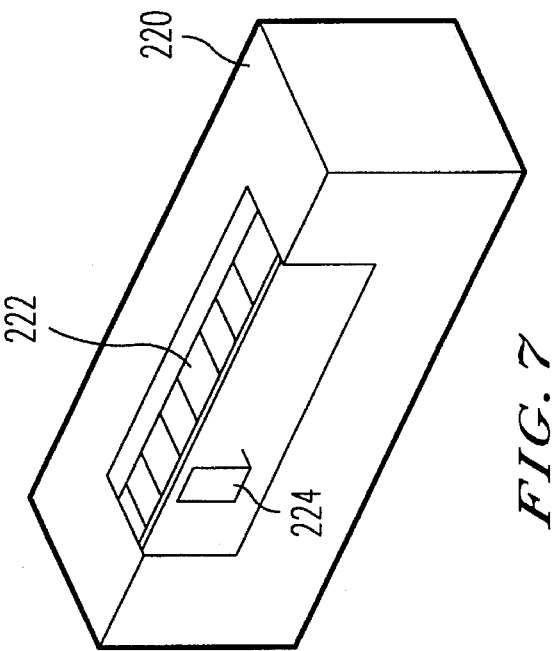
FIG. 7 is an illustration of a printer using a rubber belt and an impact hammer.

FIG. 7 illustrates a printer 220 having a rubber belt 222 and an impact hammer 224. The rubber belt 222 is a continuous loop and is rotated by a motor (not shown) until the desired character is over the impact hammer 224. There can be a plurality of impact hammers 224 underneath the rubber belt or the impact hammer 224 can move across the length of the printer.

Figure 8:
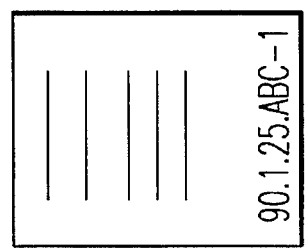
FIG. 8 illustrates a sheet of paper which has been stamped on the bottom portion.

FIG. 8 illustrates a sheet of paper having printing along the bottom portion. This printing is an exemplary form of printing which the various stampers and printers used by the present invention can print. Each of the printers used by the present invention can be considered microprinters or microprinting stamps and a stamper can be considered a printer, and vice versa.

The exit roller 9 is driven by a document feed (DF) motor (not shown) which can be controlled by a special purpose CPU thereof. When the DF CPU receives the feed next page signal from a general CPU (not shown) which controls the operation of the multi-functioned complex machine, the DF motor starts turning. Simultaneously, the transport belt 8 carries the document sheets to the exit roller 9, and the exit roller 9 ejects the scanned document.

The stamper is also controlled by the DF CPU, although it is possible to control the stamper and complex device using different arrangements of processors. When the DF CPU receives a stamp start signal, the DF motor starts rotating to transport the document sheet to the stamp position. When the sheet reaches the stamp position, the DF motor stops. The manner in which the position at which the stamping occurs is detailed below. Note that if the rotary stamper is used, it may not be necessary to stop the DF motor. The DF CPU energizes the stamp if the page of the document sheet was scanned successfully, for example if, in a facsimile mode, the page was sent (immediate transmission) or stored successfully (memory transmission). After stamping the document sheet, the DF motor ejects the document sheet into the document receiving tray 12.

Figure 9:
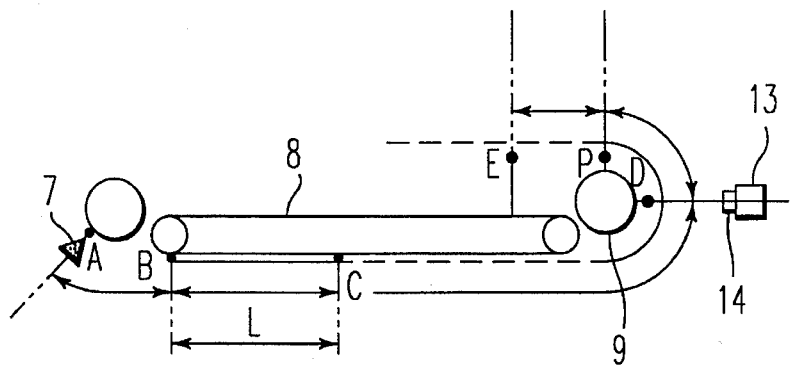
FIG. 9 illustrates various transport positions in the document feeding mechanism when the front edge of the document is used to determine the stamping position.

Next, referring to FIGS. 9–12, the method of determining of the position of stamping the document sheet will be explained. FIG. 9 illustrates the stamping positions when the stamp is placed relative to the front edge of the sheet. In FIG. 9, point A is a detecting point at which sensor 7 is located which detects the front and rear edges of the separated sheet. Point B is the starting point of scanning and point C is the position of the front edge of the sheet when the rear edge is positioned at point B. Point D is a stamping point and point B is the front edge of the sheet when the sheet is at the stamping position. Point E is the position of the front edge of the scanned document when the rear edge of the scanned document sheet is positioned at point D. Points A, B, and D are fixed and the distance between points A and B, and the distance between points B and D can be calculated.

Figure 10:
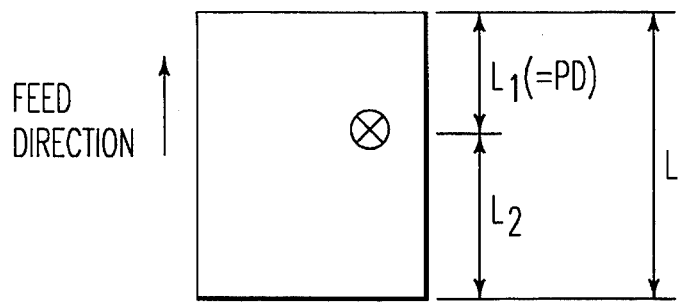
FIG. 10 illustrates a page and stamp position thereon calculated using the front edge of the document.

In order to stamp on a data side of the scanned sheet, the data side of the scanned sheet needs to face the stamp face 14. As seen in FIG. 10, the length PD from the front edge P is the stamp position. Regulating the length PD can be performed to vary the stamp position.

The document sheet which is set on the document table 1 is conveyed, and when the front edge of the document sheet passes past point A, the document feed sensor 7 turns on. When the rear edge of the document sheet passes point A, the document feed sensor 7 turns off. The length L of the document sheet is calculated by determining the time from when the document feed sensor 7 turns on to when the sensor turns off and multiplying the determined time by the speed at which the paper is traveling. The length L is equal to the distance BC, and is also equal to the distance DE.

Figure 11:
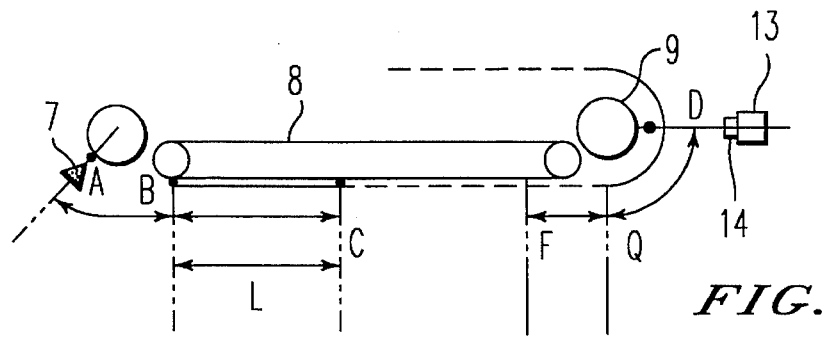
FIG. 11 illustrates various transport positions of the document feeder when the rear edge of the document is used to determine the stamping position.
Figure 12:
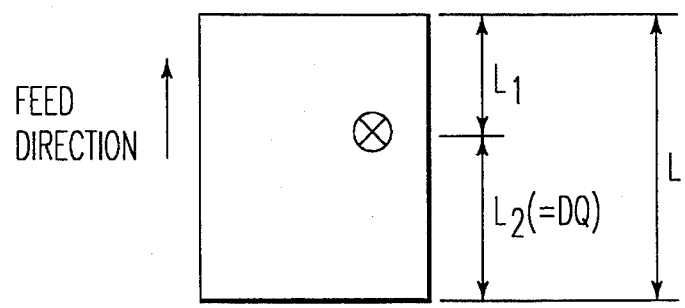
FIG. 12 illustrates a page having a stamp thereon, the position of which is determined using the rear edge of the page.
Figure 13:
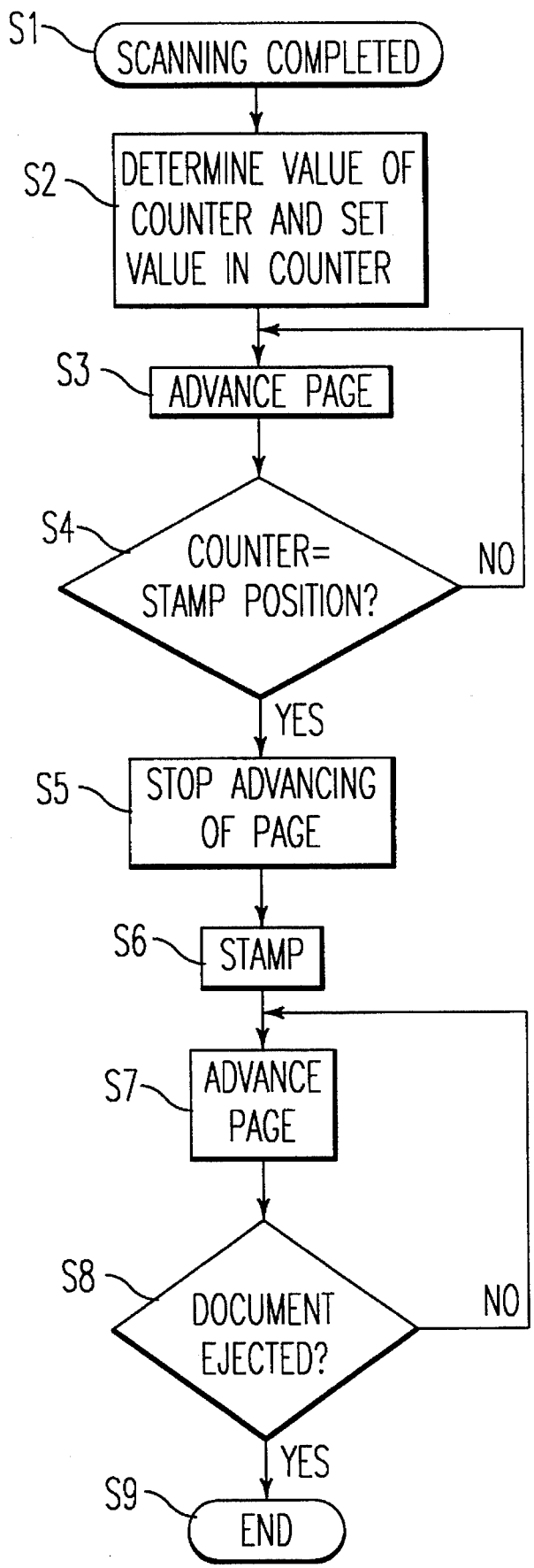
FIG. 13 is a flowchart illustrating the steps performed during the stamping process.
Figure 14:
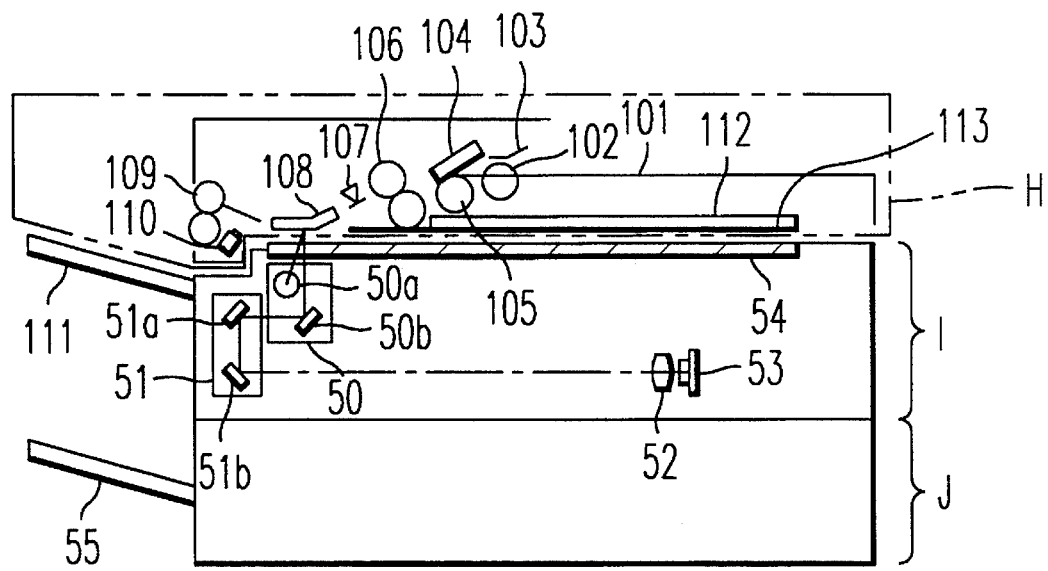
FIG. 14 illustrates a prior art multi-functioned complex machine including a pass-through styled automatic document feeder having a stamping function.

FIGS. 11 and 12 correspond to FIGS. 9 and 10 except that the stamping position is determined using the rear edge of the paper and not the front edge as was done in FIGS. 9 and 10. In FIG. 11, point D is the stamping position and point Q is the position of the rear edge of the sheet when the document is in the stamping position. The distance DF is equal to the length L of the page which is also equal to the distance BC. In FIG. 12, the stamping position is illustrated as being the distance from Q, the rear edge of the page, to D, the stamping position.

Next, referring to FIG. 9, the controlling of the stamping operation will be explained. When the document is loaded by the document feeder, the sensor 7 determines the length of the page as explained above. The sheet is conveyed past the sensor 7 and conveyed by the transport belt 8 until the front edge of the sheet reaches point C. The transport belt 8 then stops and the sheet is scanned by the scanning mechanism. When the scanning is completed in step S1, the value of a counter is determined and set in a counter. This value is used to determine when the document reaches the scanning position. The stamping position on the page can be determined based on the length of the page by, for example, placing the stamp at a position relative to the length, or by some other method such as being manually input by an operator. When the scanning position of the page is determined, it can be calculated how far the page must be moved from the scanning position until it reaches the stamping position. Once the distance the page must be moved in order to reach the scanning position is determined, the value of the counter is determined based on this distance the page must move. The counter can be a count-down timer and the time set into the counter is based on the distance the page must travel and the rate at which the page is traveling. Alternatively, the mechanisms which drive the various rollers and conveyor can be connected to an encoder and the movement of the sheet which is necessary to reach the stamping position can be monitored based on signals from a rotary encoder. A value can be set in the counter which corresponds to a signal from the rotary encoder and as the page moves, the counter can count down until the counter indicates the page is at the desired position.

After the value is set in the counter in step S2, step S3 begins advancing the page. In step S4, the counter is examined to see if it indicates that the page is at the stamp position. If it is not, flow returns back to step S3 where the page is advanced again. If it is determined that the page is at the stamp position in step S4, flow proceeds to step S5 which stops the advancing of the page. The document is then stamped in step S6. It is to be noted that under various circumstances, such as if a rotary stamper is used, it may not be necessary to stop the advancing of the page in step S5. After stamping, the page is again advanced in step S7 and in step S8, it is determined if the document is ejected. If it is ejected, the process is terminated in step S9 and if it is not, steps S7 and S8 are repeated until the document is ejected.

Note that in the embodiment illustrated in FIGS. 9 and 10, the page is advanced in step S3 until the front edge of the page reaches point P. Alternatively, if the embodiment illustrated in FIGS. 11 and 12 is used, the document is advanced until the rear edge of the page is at point Q. The front edge of the page and rear edge of the page provide different landmarks on the page which are used in calculating the position of the page and the determination of the stopping point of the advancement of the page when the stamping point reaches point D.

Thus, it is possible to stamp marks on the data side of the document sheets using the recycling type automatic document feeder so that the operator can easily recognize that the scanning is finished by observing the stamps on the sheets. The present invention also makes it possible to stamp on short length document sheets without sensors such as the document exit sensor 11 of FIG. 15.

It is possible to control the invention such that the stamp works only when using the multi-functioned complex machine as a facsimile device. Also, the operator can manually select the stamp mode by using the operation board 56 when using any mode of the multi-function complex machine. Thus, it is possible to stamp on the document in the facsimile mode and also, the operator can stamp on the document using any mode.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by LETTERS PATENT of the United States is:

1. A document scanning apparatus, comprising:
   an automatic document feeder having a pick-up section including a first document reversal section which reverses an orientation of a sheet picked up from said pick-up section from facing upwardly to facing downwardly, and a document eject section including a second document reversal section which reverses an orientation of the sheet from facing downwardly to facing upwardly;
   a sensor in said pick-up section for detecting a length of a document to be scanned;
   a scanning mechanism disposed at a region under the automatic document feeder between the pick-up section and the document eject section;
   a stamp located in said document eject section for stamping a scanned document; and
   a controller for controlling a stamping position on said scanned document using said detected length of said document.

2. The document scanning apparatus of claim 1, wherein said controller controls the stamping position using an edge of said document.

3. The document scanning apparatus of claim 2, wherein said controller controls the stamping position using a front edge of said document.

4. The document scanning apparatus of claim 2, wherein said controller controls the stamping position using a front edge of said document.

5. The document scanning apparatus of claim 1, wherein said scanning apparatus is a facsimile device.

6. The document scanning apparatus as claimed in claim 1, wherein said scanning apparatus is a copier.

7. The document scanning apparatus as claimed in claim 1, wherein said scanning apparatus is a digital copier.

8. The document scanning apparatus as claimed in claim 1, wherein said scanning apparatus is an electrical filing system.

9. The document scanning apparatus as claimed in claim 1, wherein said scanning apparatus is an optical filing system.

10. The document scanning apparatus as claimed in claim 1, wherein said scanning apparatus is a multi-functioned complex machine including the functions of at least two of a facsimile device, a copier, a digital copier, an electrical filing system, and an optical filing system.

11. The document scanning apparatus as claimed in claim 10, wherein said multi-function complex machine comprises the function of a facsimile device.

12. The document scanning apparatus as claimed in claim 10, wherein said multi-functioned complex machine comprises a switch for selectively engaging a stamping function which causes a stamp to be placed on said scanned document when said stamp is located in said eject section.

13. The document scanning apparatus as claimed in claim 10, wherein said stamp operates only when said multi-function complex machine is used as a facsimile device.

14. The document scanning apparatus as claimed in claim 1, wherein said document elect section includes one or more exit rollers, and wherein said controller stops a movement of said one or more exit rollers during a stamping by said stamp.

15. The document scanning apparatus as claimed in claim 1, wherein said stamp is a rotary stamp.

16. A document scanning apparatus as claimed in claim 1, wherein said stamp is a microprinting stamp.

17. The document scanning apparatus of claim 1, wherein said stamp is a dot matrix printer.

18. The document scanning apparatus of claim 1, wherein said stamp is a daisy wheel printer.

19. The document scanning apparatus of claim 1, wherein said stamp is a printer having a rubber belt and an impact hammer.

20. A method of scanning and stamping a sheet, comprising the steps of:
   feeding a sheet having data thereon facing upwardly from a feed tray into a document feed section;
   determining a length of said sheet using a sensor in said feed section, when said sheet is in the document feed section;
   reversing a position of said sheet to have the data thereon face downwardly while advancing said sheet through the feed section to a scanning portion;
   scanning said sheet at the scanning position;
   determining a distance between the scanning position and the stamped;

determining an advancing distance the sheet is to be moved from the scanning position to reach a sheet stamping position using the determined length of the sheet and the determined distance between the scanning position and the stamper;

advancing said sheet said determined advancing distance from the scanning position to the sheet stamping position; and stamping said sheet while said sheet is at the sheet stamping position.

21. A method according to claim 20, further comprising the step of:

reversing a position of said sheet to have the data thereon face upwardly, after stamping by said stamping step, and ejecting said sheet out of a region at which said stamping step is performed.

22. An apparatus for scanning and stamping a sheet, comprising:

a feed tray for holding a sheet having data thereon facing upwardly;

a document feed section disposed next to the feed tray including a document reversal roller which reverses an orientation of the sheet;

a sensor disposed within the document feed section;

a scanner located at a scanning section;

a stamper located at a sheet stamping position; and a control means for:

commanding a feeding of the sheet from the feed tray into the document feed section;

commanding an advancing of said sheet through the feed section to a scanning position disposed next to the scanning section so that the data thereon faces downwardly after having the orientation thereof reversed by the reversal roller;

determining a length of said sheet using the sensor in said feed section, when said sheet is in the document feed section;

determining a distance between the scanning position and the stamper;

commanding a scanning of said sheet at the scanning position;

determining an advancing distance the sheet is to be moved from the scanning position to reach the sheet stamping position using the determined length of the sheet and the determined distance between the scanning position and the stamper;

commanding an advancing of said sheet said determined advancing distance from the scanning position to the sheet stamping position; and commanding a stamping of said sheet by said stamper while said sheet is at the sheet stamping position.

* * * * *